United States Patent [19]

Severance, Jr. et al.

[11] Patent Number: 4,521,666
[45] Date of Patent: Jun. 4, 1985

[54] PLASMA ARC TORCH

[75] Inventors: Wayne S. Severance, Jr., Florence; George T. Rogers, Society Hill, both of S.C.

[73] Assignee: Union Carbide Corporation, Danbury, Conn.

[21] Appl. No.: 452,452

[22] Filed: Dec. 23, 1982

[51] Int. Cl.$^3$ ................................. B23K 9/00
[52] U.S. Cl. ...................... 217/121 PY; 219/121 PH; 219/121 PP; 219/121 PQ; 219/75; 313/231.31
[58] Field of Search ............... 219/121 PM, 121 PQ, 219/121 PP, 121 PY, 76.16, 121 P, 75; 313/231.3, 231.4, 231.5; 315/111.21

[56] References Cited

U.S. PATENT DOCUMENTS

| | | | |
|---|---|---|---|
| 3,851,140 | 11/1974 | Coucher | 219/121 PQ |
| 3,949,188 | 4/1976 | Tateno | 219/121 PQ |
| 4,163,891 | 8/1979 | Komatsu et al. | 219/121 PP |
| 4,311,897 | 1/1982 | Yerushalny | 219/121 PP |
| 4,361,748 | 11/1982 | Couch, Jr. | 219/121 PP |

Primary Examiner—M. H. Paschall
Attorney, Agent, or Firm—E. Lieberstein

[57] ABSTRACT

A plasma arc process and a combination plasma arc torch and nozzle assembly in which the arc plasma gas composition contains at least 50% oxygen. An oxygen containing reactive gas is passed through a gap between a first and second nozzle body of a nozzle assembly having a first and second arc constricting passageway adapted to constrict the arc plasma. The width of the gap is of a critical dimension to permit a tungsten electrode to be used without suffering from rapid electrode erosion.

8 Claims, 5 Drawing Figures

PLASMA ARC TORCH

This invention relates to a combination plasma arc torch and nozzle assembly and to a plasma arc process in which the arc plasma effluent includes an oxygen containing reactive gas and nitrogen.

The plasma arc process in which an arc is constricted through a nozzle by passing a vortical flow of gas around the arc was first disclosed in U.S. Pat. No. 2,806,124 issued in the name of R. M. Gage. The process was modified as taught in U.S. Pat. No. 2,862,099 to include reactive gases containing oxygen.

The inclusion of a reactive gas containing oxygen into the plasma arc results in faster cutting speeds particularly for cutting low carbon steel and in general will improve the quality of the cut as compared to a conventional plasma torch operating with a plasma arc gas consisting solely of nitrogen. The principle disadvantage of the use of an oxygen containing reactive gas is the short lifetime of the electrode which begins to erode immediately in the presence of a reactive gas. The erosion time is, in fact, so fast that at high current density the failure can be considered instantaneous and catastrophic.

An oxygen containing reactive gas includes air, carbon dioxide, water vapor and pure oxygen. The air plasma process as practiced today uses air as the plasma arc gas medium and is limited to a current of no more than about 250 amps. At this current level or lower, it is possible to sustain the life of a water cooled hafnium or zirconium insert electrode for a period of typically between two to four hours. The more conventional and far less expensive tungsten electrode cannot be used even at low current levels.

Repeated attempts have been made to operate a plasma arc torch with a conventional tungsten or thoriated tungsten insert electrode by, for example, altering the composition of the plasma gas to include hydrogen or by using argon in a complex three stage nozzle arrangement in which argon is introduced in the first stage, largely removed in the second and in which oxygen is finally provided in the third stage. This arrangement apparently permits a tungsten electrode to be used but only for a short interval of time and with a maximum allowable current of the order of only 150 amperes.

In an air plasma torch it is conventional to introduce a stream of air into the torch in intimate contact with the electrode. The air passes around the electrode and through the arc constricting passageway and represents the sole constituent of the arc plasma gas composition. Alternative designs introduce an oxygen containing reactive gas into the arc plasma downstream of the electrode position. In all prior art designs the electrode suffered from rapid destructive erosion when an oxygen containing gas was passed through the arc torch in forming the arc plasma. The art has long sought a plasma arc torch design which would permit the use of a conventional tungsten electrode with an oxygen containing reactive gas without suffering from rapid electrode erosion.

In accordance with the present invention an oxygen containing reactive gas is aspirated into the arc plasma with minimal effect on electrode life other than what would be expected in a pure nitrogen plasma even at operating current levels as high as 700 amperes. To achieve this result a two component nozzle assembly is preferably used having a first nozzle body surrounding a cathode electrode preferably of tungsten and a depending second nozzle body spaced apart from the first nozzle body to form a gap between the opposing surfaces of the nozzle bodies. The gap provides a passageway, preferably of annular geometry for introducing oxygen into the plasma effluent. The oxygen containing gas becomes a constituent component of the plasma arc gas composition. Each nozzle body includes an orifice for constricting the plasma arc. The two orifices are coaxial and form, in combination, the arc constricting passageway for the plasma torch. A stream of nitrogen is passed in a conventional fashion through the arc constricting passageway provided by each orifice whereas the oxygen containing reactive gas is aspirated into the plasma arc through the orifice in the second nozzle body. The first nozzle body operates primarily to shield the tungsten electrode with the primary arc constriction occuring through the arc passageway provided by the second nozzle body. The second nozzle body functions primarily as the main nozzle for the plasma torch. The present invention is based upon the discovering that the width of the gap between the two nozzle bodies is critical to the performance of the torch and must be no greater than about 0.030 of an inch in width and no less than about 0.005 of an inch.

It has been further discovered in accordance with the process of the present invention that a significant increase in cutting speed can be achieved by adjusting the gas flow rates and the concentration level of oxygen introduced into the arc torch to form an arc plasma having an oxygen concentration level of above about fifty percent oxygen and preferably within the range of from about 60 to about 75 percent oxygen.

Accordingly, the main object of the present invention is to provide in combination a plasma arc torch and nozzle assembly for use with an oxygen containing reactive gas which will sustain the life of the cathode electrode over long periods of time with minimal erosion at operating current levels which may extend up to 700 amps.

It is a further object of the present invention to provide a plasma arc process capable of operating at speeds substantially greater than achieved with commercially available air plasma torches under similar operating conditions.

These and other objects and advantages of the present invention will become apparent from the following detailed description of the invention when read in conjunction with the accompanying drawings of which:

Figure 1:
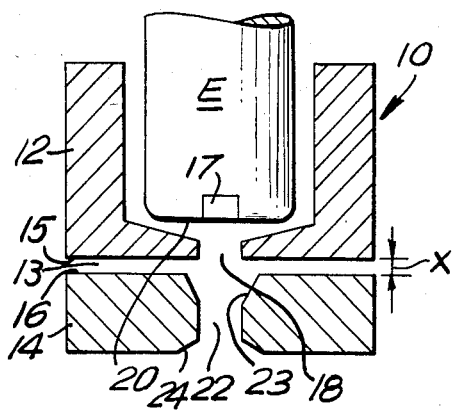
FIG. 1 is a schematic diagram of the preferred embodiment of the nozzle assembly for use in combination with the plasma arc torch of the present invention.
Figure 2:
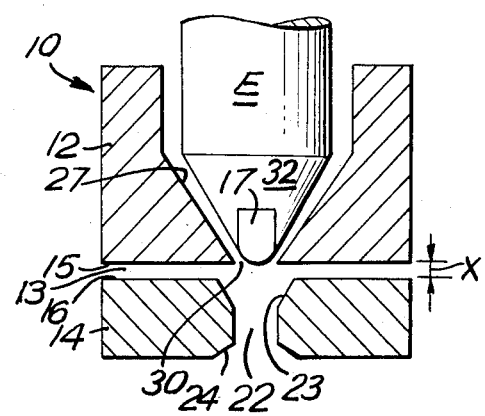
FIG. 2 is another schematic diagram of an alternative embodiment of the nozzle assembly for use in combination with the plasma arc torch of the present invention.
Figure 3:
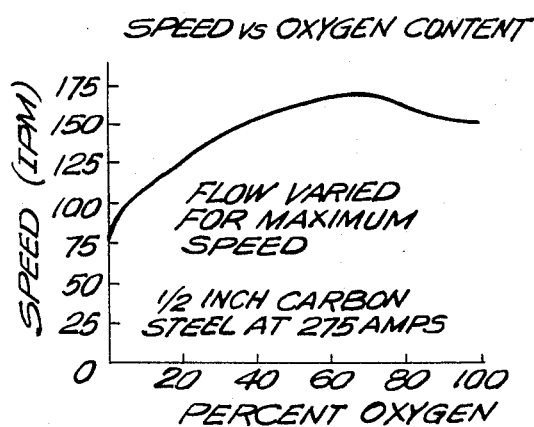
FIG. 3 is a graph of the cutting speed of the plasma arc torch of the present invention at different plasma arc oxygen concentration levels with the gas flow conditions to achieve maximum cutting speed at each flow condition.
Figure 4:
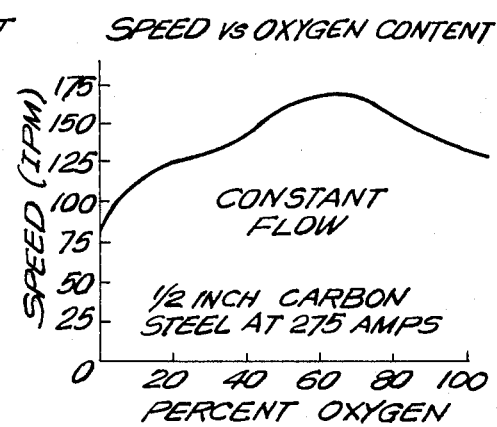
FIG. 4 is another graph similar to FIG. 3 with the gas flow held constant while the oxygen concentration is varied.
Figure 5:
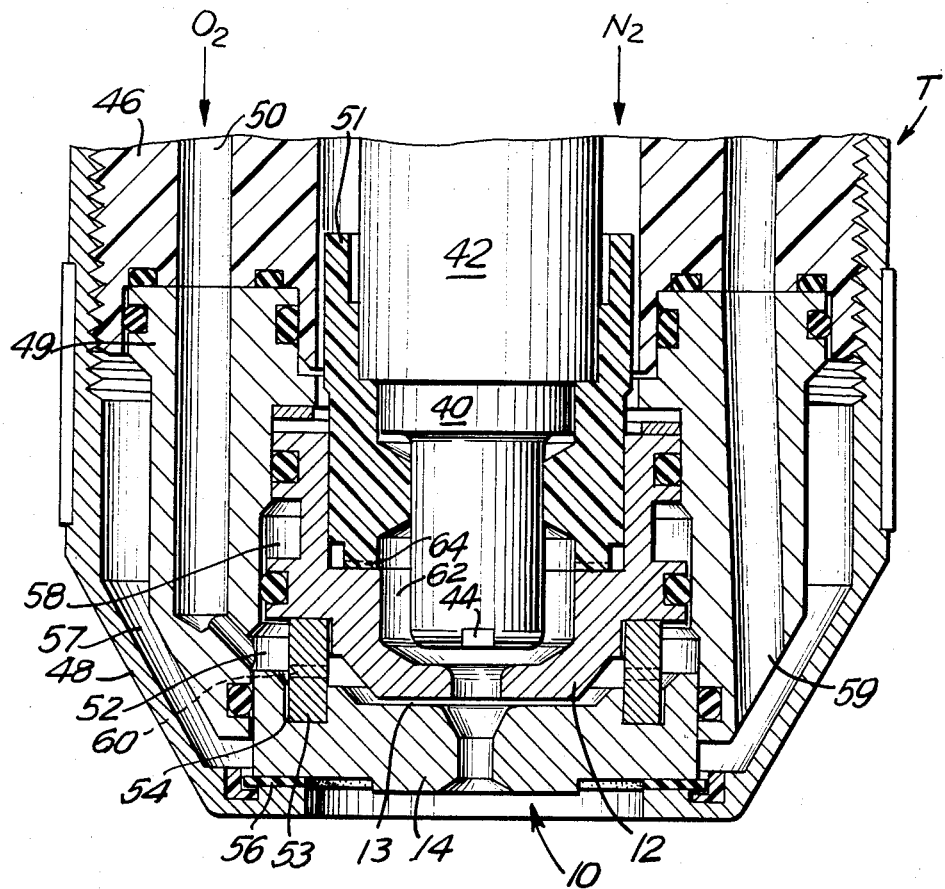
FIG. 5 is a side elevation of the construction of the plasma arc torch of the present invention incorporating the nozzle assembly shown in the preferred embodiment of FIG. 1.

Referring now to FIGS. 1-2 inclusive illustrating two alternate embodiments of the nozzle assembly 10 of the present invention. The nozzle assembly is to be used in combination with a plasma arc torch T, the preferred construction of which is shown in FIG. 5, which will be discussed in more detail later in the specification. The operating characteristic curves for the plasma torch and nozzle assembly of the present invention is shown in FIGS. 3 and 4. The curves compare torch speed versus percent oxygen in a nitrogen-oxygen plasma gas composition at both constant and varying arc gas flow conditions.

The preferred nozzle assembly 10 as shown in FIG. 1 comprises a shield nozzle body 12 and a lower depending main nozzle body 14 which is spaced from the shield nozzle body 12 to form a gap 13 between the opposing faces 15 and 16 of the nozzle bodies 12 and 14 respectively. The gap 13 has a critical width "x" the importance of which will be discussed hereafter.

The nozzle assembly 10 is supported in a plasma torch T, as will be more elaborately described in connection with FIG. 5, with the shield nozzle 12 surrounding a nonconsumable electrode E. The electrode E is preferably of copper having a tungsten or thoriated tungsten insert 17. The shield nozzle 12 has a bore 18 of substantially cylindrical geometry disposed beneath the electrode E in substantial axial alignment with the electrode. The bore 18 defines a first arc constricting passageway for the plasma torch T. The face 20 of the electrode E, in which the insert 17 is seated, is preferably flat, i.e., lies in a plane substantially transverse to the longitudinal axis of the electrode E. The main nozzle 14 has a bore 22 of substantially cylindrical geometry which is coaxially aligned with the bore 18 and the electrode E. The bore 22 defines a second arc constricting passageway for the torch T. The bore 22 may be formed with two chamfered ends 23 and 24 respectively. The contour of the chamfered end 23 and its angle of intersection with the face 16 of the lower nozzle body 14 is not significant to the invention. However, the width "x" of the gap 13 between the nozzle bodies 12 and 14 has been found to be critical. Within this critical space oxygen can be introduced without eroding the cathode electrode. The width "x" should be measured longitudinally between the adjacent opposing faces 15 and 16 of the nozzle bodies 12 and 14 respectively. Although the opposing faces 15 and 16 do not have to be parallel to one another a parallel relationship from a manufacturing standpoint is preferred. If the opposing faces 15 and 16 are not parallel the critical width "x" is the minimum distance between the faces at a point along the gap 13 nearest the arc constricting passageways. As long as the width "x" is held to below about 0.03 of an inch and preferably between 0.005 and 0.025 of an inch, no significant erosion of the electrode E is visible to the naked eye.

The oxygen containing reactive gas should preferably be introduced into the gap 13 in a swirl flow fashion. A stream of nitrogen gas should be passed into the plasma torch T to flow about the electrode E and through both the first and second arc constricting passageways in a conventional swirling fashion. It should be noted that in general, the electrode E is most susceptible to erosion in the presence of oxygen during the torch start up time period. Accordingly, the critical requirement for the width "x" of gap 13 was proven by performing successive start up tests with a conventional plasma torch using the nozzle configuration embodiment of FIG. 1 under identical conditions except for variations in the width "x" of gap 13. A start up test is conducted by establishing an arc between the electrode and workpiece (not shown) for about twenty seconds, terminating the arc and then reestablishing the arc. Two operating currents of 200 and 400 amps respectively were used in conducting the tests. With a width "x" below about 0.03 inches and more specifically at 0.025 inches no erosion was visible even after sixty starts whereas above 0.03 inches and more specifically at 0.037 inches visible erosion was noticed after several starts even at the low current level. In the latter case the electrode life was sustained for only about five minutes. Accordingly, it was concluded that the width "x" of gap 13 is critical with apparently no oxygen being bled back through the bore 18 of the upper nozzle body to erode the electrode E. In accordance with the present invention the electrode E will experience a normal lifetime comparable to operation in a purely nitrogen atmosphere.

The dimensions of the bore 18 in the upper nozzle body 12 and the bore 22 in the lower nozzle body 14 are selected to accommodate the operating current and to establish a desired operating voltage.

An alternative nozzle configuration which is less desirable but within the concept of the present invention is shown in FIG. 2.

In the nozzle arrangement shown in FIG. 2 the lower nozzle body 14 is essentially identical to its counterpart body 14 of FIG. 1. The upper nozzle body 12 has a converging conical geometry 27 which forms an orifice 30 with the front face 15 of the nozzle body 12. The orifice 30 is concentric with the electrode E and the bore 22 of the lower body 14. The electrode E may also have a conically shaped front end 32 substantially conforming to the conical geometry 27 of the upper nozzle body 12. The tungsten insert 17 should extend to a position substantially equal with or just above the orifice 30. The width "x" of gap 13 must, of course, comply with the critical dimensions specified for the FIG. 1 embodiment.

It was further discovered in accordance with the present invention that significantly higher cutting speeds may be obtained relative to a conventional plasma torch by injecting oxygen through the gap 13 so as to raise the oxygen concentration level of the plasma arc gas composition to above about 40% oxygen by volume. FIGS. 3 and 4 are experimental curves developed by plotting speed versus percent oxygen. In FIG. 3 the curve is maximized by adjusting the gas flow rate for maximum torch speed at a given arc plasma oxygen concentration level. In FIG. 4 the flow rare is held constant. The workpiece was ½ inch carbon steel and the operating current was 275 amps. The quality of cut was excellent. Optimum performance was realized with a arc plasma gas oxygen concentration level of above 40% and preferably between 60 to 75% as is apparent from the two graphs in FIGS. 3 and 4. It should be noted that the cutting speed increases with increasing concentration levels of oxygen in the arc plasma effluent until up to about 75% oxygen and then begins to decrease as the oxygen concentration level is increased to 100% oxygen.

A detailed construction of a plasma arc torch T incorporating the nozzle assembly 10 of FIG. 1 is shown in FIG. 5. The Torch T includes a nonconsumable electrode structure 40, preferably of copper having a flat electrode configuration equivalent to electrode E of FIG. 1 and a tungsten or thoriated tungsten insert 44 which serves as the cathode terminal for the plasma torch T. The electrode structure 40 is connected to a metal rear body member 42 which, in turn, is connected to the torch body 46 by means not shown.

The nozzle assembly 10 is supported by a nozzle retaining cap 48 which is detachably engaged to the upper torch body 46. As indicated heretofore in connection with FIG. 1, the nozzle assembly 10 includes an upper shield nozzle body 12 and a lower main nozzle body 14 separated from the upper nozzle body 12 to form the gap 13. The gap must be sized to satisfy the critical dimension range set forth hereinbefore. The upper torch body 46 has an elongated lower section 49 which holds the nozzle assembly 10 in place. A nitrogen swirl ring 51 is mounted on the upper nozzle body 12 in surrounding engagement with electrode structure 40. A gas passageway 50 extends through the torch body 46 and the lower section 49. The gas passageway 50 communicates through an open chamber 52 with the gap 13. An oxygen containing gas is passed through the gas passageway 50 from a supply source (not shown). A gas swirl ring 53 is located in the open chamber 52 to form a gas vortex within the gap 13 by tangentially injecting the oxygen containing gas into the gap 13. The swirl ring 53 is of conventional design and includes a plurality of radially directed holes 60 arranged circumferentially about the swirl ring 53. The swirl ring 53 is mounted in a grooved opening 54 in the lower nozzle body 14. An insulating gasket 56 electrically isolates the nozzle retaining cup 48 from the lower nozzle body 14. Water passageways 57, 58 and 59 are provided for cooling both the nozzle assembly 10 and the lower depending section 49 of the torch body 46. The lower depending section 49 of the torch body 46 is composed of a metal such as brass whereas the torch body 46 is preferably of an insulating material. The lower and upper bodies 12 and 14 of the nozzle assembly are fabricated from an electrically conducting material such as copper.

A stream of nitrogen from a nitrogen gas supply (not shown) is passed around the rear body member 42 of the electrode structure 40 and into the nitrogen swirl baffle ring 51 into the plenum chamber 62 via inlet holes 64. The inlet holes 64 are arranged to cause the nitrogen to enter the plenum chamber 62 in a swirling fashion as is well known in the art.

A power supply (not shown) is connected to the torch electrode structure 40 in a series circuit relationship with the workpiece (not shown). A plasma arc is established between the cathode terminal 44 of the torch T and the workpiece. The plasma arc is formed in a conventional manner by momentarily establishing a pilot arc between the electrode structure 40 and the nozzle assembly 10 which is then transferred to the workpiece through the arc constricting passageways 18 and 22 respectively.

Although any oxygen containing reactive gas may be passed into the gap 13, a gas composition of essentially pure oxygen is preferred. The composition of the arc plasma effluent should comprise nitrogen and oxygen and preferably consist essentially of only nitrogen and oxygen with an oxygen concentration level of above 40% oxygen and preferably between 60 to 75% oxygen. It should be noted that inert gases other than nitrogen, such as argon and helium, are not as desirable as nitrogen and for reasons which are not fully understood may not be substituted for nitrogen in practicing the present invention. Very minor additions of such inert gases may however be added to the nitrogen stream in forming the arc plasma effluent.

We claim:

1. A method of operating a plasma arc torch having a nonconsummable electrode and a first and second arc constricting passageway each coaxially arranged relative to one another comprising the steps of:

forming a high pressure arc plasma between the nonconsummable electrode and the workpiece;

constricting said arc through said first arc constricting passageway;

further constricting said arc through said second arc constricting passageway with said second arc constricting passageway spaced apart from said first arc constricting passageway to form a narrow gap which is between 0.005 and 0.030 inch in dimension;

introducing a stream of only nitrogen gas having a swirl flow pattern around said electrode and through said first and second arc constricting passageways;

introducing a stream of an oxygen containing reactive gas only into said gap and in a swirl flow pattern such that said gas passes through said second arc constricting passageway and aspirates into said nitrogen stream with substantially no backflow through the first arc constricting passageway;

adjusting the flow of nitrogen gas relative to the flow rate of said oxygen containing reactive gas to alter the concentration of oxygen in said arc plasma to a total concentration of at least about 40% oxygen by volume.

2. A plasma arc process as defined in claim 1 wherein said stream of oxygen containing reactive gas is essentially pure oxygen such that said arc plasma consists essentially of only oxygen and nitrogen.

3. A plasma arc process as defined in claim 2 wherein the flow ratio of oxygen relative to the flow of nitrogen gas is adjusted to form an arc plasma consisting essentially of only oxygen and nitrogen having an oxygen concentration within a range of from about 60 to about 75% oxygen.

4. In combination a plasma torch having a nonconsummable cathode electrode adapted to be connected in circuit with a power supply and workpiece for establishing a plasma arc between said electrode and the workpiece and a nozzle assembly for constricting said arc said nozzle assembly comprising: an upper nozzle body surrounding said electrode, a first arc constricting passageway disposed in said upper nozzle body in substantial coaxial alignment with said electrode cathode; and a lower nozzle body having a second arc constricting passageway to form a gap "X" having a fixed spacing of between 0.005 to 0.03 inches in dimension measured longitudinally between the nozzle bodies; said second arc constricting passageway being coaxial with said first arc constricting passageway; means for introducing a stream of oxygen containing reactive gas between said upper nozzle body and said lower nozzle body and into said gap and means for introducing a swirl stream of nitrogen gas into said upper nozzle body for passing about said electrode and through said first and second arc constricting passageways.

5. In the combination of claim 4 wherein said cathode electrode has a tungsten or thoriated tungsten insert with a substantially flat electrode face.

6. In the combination of claim 5 wherein said upper nozzle body is spaced from said lower nozzle body to form a passageway into which said stream of oxygen is introduced with said passageway extending into said gap and having a longitudinal axis in a direction lying essentially transverse to said first and second arc constricting passageway.

7. In the combination of claim 6 wherein said gap is annular in geometry.

8. In the combination of claim 4 wherein said cathode electrode has a pointed end configuration and wherein said first arc constricting passageway is an orifice disposed substantially coaxial to and in close proximity with the pointed end of said electrode.

* * * * *

UNITED STATES PATENT AND TRADEMARK OFFICE
CERTIFICATE OF CORRECTION

PATENT NO.  : 4,521,666
DATED       : June 4, 1985
INVENTOR(S) : Wayne S. Severance, Jr.; George T. Rogers It is certified that error appears in the above-identified patent and that said Letters Patent is hereby corrected as shown below:

Col. 1, line 9, the word "vortical" should be changed to -- vertical --.

Col. 1, line 31, the word "possiole" should be changed to -- possible --.

Col. 4, line 52, the word "rare" should be changed to -- rate--; line 56, the word "a" should be changed to -- an --.

Signed and Sealed this

Third Day of December 1985

[SEAL]

Attest:

DONALD J. QUIGG

Attesting Officer

Commissioner of Patents and Trademarks